(12) United States Patent
Wasserman

(10) Patent No.: US 12,508,437 B2
(45) Date of Patent: Dec. 30, 2025

(54) USING CAPACITORS TO REGULATE CURRENT IN TRANSDUCER ARRAYS FOR APPLYING TUMOR TREATING FIELDS (TTFIELDS)

(71) Applicant: Novocure GmbH, Root (CH)

(72) Inventor: Yoram Wasserman, Haifa (IL)

(73) Assignee: Novocure GmbH, Baar (CH)

( * ) Notice: Subject to any disclaimer, the term of this patent is extended or adjusted under 35 U.S.C. 154(b) by 781 days.

(21) Appl. No.: 17/851,326

(22) Filed: Jun. 28, 2022

(65) Prior Publication Data

US 2023/0019638 A1 Jan. 19, 2023

Related U.S. Application Data

(60) Provisional application No. 63/216,678, filed on Jun. 30, 2021.

(51) Int. Cl.
*A61N 1/40* (2006.01)

(52) U.S. Cl.
CPC ...................... *A61N 1/40* (2013.01)

(58) Field of Classification Search
None
See application file for complete search history.

(56) References Cited

U.S. PATENT DOCUMENTS

| | | | |
|---|---|---|---|
| 5,766,153 A * | 6/1998 | Eggers | A61M 25/0133 604/114 |
| 6,868,289 B2 | 3/2005 | Palti | |
| 7,016,725 B2 | 3/2006 | Palti | |
| 7,089,054 B2 | 8/2006 | Palti | |
| 7,136,699 B2 | 11/2006 | Palti | |
| 7,333,852 B2 | 2/2008 | Palti | |
| 7,467,011 B2 | 12/2008 | Palti | |
| 7,519,420 B2 | 4/2009 | Palti | |
| 7,565,205 B2 | 7/2009 | Palti | |
| 7,565,206 B2 | 7/2009 | Palti | |
| 7,599,745 B2 | 10/2009 | Palti | |
| 7,599,746 B2 | 10/2009 | Palti | |
| 7,706,890 B2 | 4/2010 | Palti | |
| 7,715,921 B2 | 5/2010 | Palti | |
| 7,805,201 B2 | 9/2010 | Palti | |
| 7,890,183 B2 | 2/2011 | Palti et al. | |
| 7,912,540 B2 | 3/2011 | Palti | |

(Continued)

OTHER PUBLICATIONS

International Search Report and Written Opinion issued in application No. PCT/IB2022/056002 dated Sep. 29, 2022.

*Primary Examiner* — Shirley X Jian
(74) *Attorney, Agent, or Firm* — Potomac Law Group, PLLC

(57) ABSTRACT

Transducer arrays for applying alternating electric fields (e.g., tumor treating fields a.k.a. TTFields) to a subject's body typically include a plurality of capacitively coupled electrode elements. Often, certain electrode elements on a given array tend to run hotter than other electrode elements. For example, in many anatomical contexts, the corner elements of the transducer array tend to run hotter than the non-corner elements. The spread of operating temperatures between the electrode elements that tend to run hotter and the other electrode elements can be reduced by wiring a capacitor in series with those electrode elements that tend to run hotter (e.g., the corner elements).

16 Claims, 10 Drawing Sheets

(56) References Cited

U.S. PATENT DOCUMENTS

| | | | |
|---|---|---|---|
| 7,917,227 B2 | 3/2011 | Palti | |
| 8,019,414 B2 | 9/2011 | Palti | |
| 8,027,738 B2 | 9/2011 | Palti | |
| 8,170,684 B2 | 5/2012 | Palti | |
| 8,175,698 B2 | 5/2012 | Palti et al. | |
| 8,229,555 B2 | 7/2012 | Palti | |
| RE43,618 E | 8/2012 | Palti | |
| 8,244,345 B2 | 8/2012 | Palti | |
| 8,406,870 B2 | 3/2013 | Palti | |
| 8,447,395 B2 | 5/2013 | Palti et al. | |
| 8,447,396 B2 | 5/2013 | Palti et al. | |
| 8,465,533 B2 | 6/2013 | Palti | |
| 8,706,261 B2 | 4/2014 | Palti | |
| 8,715,203 B2 | 5/2014 | Palti | |
| 8,718,756 B2 | 5/2014 | Paiti | |
| 8,764,675 B2 | 7/2014 | Palti | |
| 9,023,090 B2 | 5/2015 | Palti | |
| 9,023,091 B2 | 5/2015 | Palti | |
| 9,039,674 B2 | 5/2015 | Palti et al. | |
| 9,056,203 B2 | 6/2015 | Palti et al. | |
| 9,440,068 B2 | 9/2016 | Palti et al. | |
| 9,655,669 B2 | 5/2017 | Palti et al. | |
| 9,750,934 B2 | 9/2017 | Palti et al. | |
| 9,910,453 B2 | 3/2018 | Wasserman et al. | |
| 10,188,851 B2 | 1/2019 | Wenger et al. | |
| 10,441,776 B2 | 10/2019 | Kirson et al. | |
| 10,779,875 B2 | 9/2020 | Palti et al. | |
| 11,160,977 B2 * | 11/2021 | Naveh | A61N 1/0476 |
| 11,191,956 B2 | 12/2021 | Giladi et al. | |
| 11,395,916 B2 * | 7/2022 | Wasserman | A61N 1/3603 |
| 11,654,279 B2 * | 5/2023 | Wasserman | A61N 1/0539 607/2 |
| 12,029,898 B2 * | 7/2024 | Wasserman | A61N 1/3603 |
| 12,114,991 B2 * | 10/2024 | Wasserman | A61B 5/441 |
| 12,201,831 B2 * | 1/2025 | Wasserman | A61N 1/08 |
| 2006/0167499 A1 | 7/2006 | Palti | |
| 2007/0225766 A1 | 9/2007 | Palti | |
| 2007/0239213 A1 | 10/2007 | Palti | |
| 2009/0076366 A1 | 3/2009 | Palti | |
| 2011/0137229 A1 * | 6/2011 | Palti | A61N 1/0428 604/20 |
| 2012/0029419 A1 | 2/2012 | Palti | |
| 2012/0283726 A1 | 11/2012 | Palti | |
| 2014/0330268 A1 | 11/2014 | Palti et al. | |
| 2015/0335876 A1 | 11/2015 | Jeffery et al. | |
| 2017/0120041 A1 | 5/2017 | Wenger et al. | |
| 2017/0215939 A1 | 8/2017 | Palti et al. | |
| 2017/0281934 A1 | 10/2017 | Giladi et al. | |
| 2018/0001075 A1 | 1/2018 | Kirson et al. | |
| 2018/0001078 A1 * | 1/2018 | Kirson | A61N 1/044 |
| 2018/0008708 A1 | 1/2018 | Giladi et al. | |
| 2018/0050200 A1 * | 2/2018 | Wasserman | A61N 1/3603 |
| 2018/0160933 A1 | 6/2018 | Urman et al. | |
| 2018/0202991 A1 | 7/2018 | Giladi et al. | |
| 2018/0280687 A1 | 10/2018 | Carter et al. | |
| 2019/0117956 A1 | 4/2019 | Wenger et al. | |
| 2019/0117963 A1 | 4/2019 | Travers et al. | |
| 2019/0308016 A1 | 10/2019 | Wenger et al. | |
| 2020/0001069 A1 | 1/2020 | Kirson et al. | |
| 2020/0009376 A1 | 1/2020 | Chang et al. | |
| 2020/0009377 A1 | 1/2020 | Chang et al. | |
| 2020/0016067 A1 | 1/2020 | Gotlib et al. | |
| 2020/0023179 A1 | 1/2020 | Bomzon et al. | |
| 2020/0061360 A1 | 2/2020 | Hagemann et al. | |
| 2020/0061361 A1 | 2/2020 | Hagemann et al. | |
| 2020/0069937 A1 * | 3/2020 | Naveh | A61N 1/0476 |
| 2020/0078582 A1 | 3/2020 | Alon et al. | |
| 2020/0108031 A1 | 4/2020 | Borst et al. | |
| 2020/0114141 A1 | 4/2020 | Bomzon et al. | |
| 2020/0121728 A1 | 4/2020 | Wardak et al. | |
| 2020/0129761 A1 | 4/2020 | Bomzon et al. | |
| 2020/0146586 A1 | 5/2020 | Naveh et al. | |
| 2020/0155835 A1 * | 5/2020 | Wasserman | A61N 1/36002 |
| 2020/0171297 A1 | 6/2020 | Kirson et al. | |
| 2020/0179512 A1 | 6/2020 | Giladi et al. | |
| 2020/0219261 A1 | 7/2020 | Shamir et al. | |
| 2020/0269037 A1 | 8/2020 | Hagemann et al. | |
| 2020/0269041 A1 | 8/2020 | Zeevi et al. | |
| 2020/0269043 A1 * | 8/2020 | Wasserman | A61N 1/05 |
| 2020/0368525 A1 | 11/2020 | Maag et al. | |
| 2021/0031031 A1 | 2/2021 | Wasserman et al. | |
| 2021/0038584 A1 | 2/2021 | Voloshin-Sela | |
| 2021/0060334 A1 | 3/2021 | Avraham et al. | |
| 2021/0069503 A1 | 3/2021 | Tran et al. | |
| 2021/0187277 A1 | 6/2021 | Wasserman et al. | |
| 2021/0196348 A1 * | 7/2021 | Wasserman | A61N 1/0476 |
| 2021/0199640 A1 | 7/2021 | Patel et al. | |
| 2021/0203250 A1 | 7/2021 | Wasserman | |
| 2021/0268247 A1 | 9/2021 | Story et al. | |
| 2021/0299440 A1 | 9/2021 | Deslauriers et al. | |
| 2021/0308446 A1 | 10/2021 | Alon et al. | |
| 2021/0330950 A1 | 10/2021 | Hagemann et al. | |
| 2021/0346694 A1 | 11/2021 | Wasserman et al. | |
| 2021/0379362 A1 | 12/2021 | Smith et al. | |
| 2021/0408383 A1 | 12/2021 | Kalra et al. | |
| 2022/0095997 A1 | 3/2022 | Wasserman | |
| 2022/0096821 A1 | 3/2022 | Kirson et al. | |
| 2022/0118249 A1 | 4/2022 | Bomzon et al. | |
| 2022/0161028 A1 | 5/2022 | Giladi et al. | |
| 2022/0193435 A1 | 6/2022 | Wasserman et al. | |
| 2022/0267445 A1 | 8/2022 | Tran et al. | |
| 2022/0280787 A1 | 9/2022 | Bomzon et al. | |
| 2022/0288395 A1 | 9/2022 | Voloshin-Sela et al. | |
| 2022/0313992 A1 * | 10/2022 | Wasserman | G01R 33/4808 |
| 2023/0098801 A1 * | 3/2023 | Carlson | A61N 1/36002 607/76 |
| 2024/0123228 A1 * | 4/2024 | Wasserman | A61N 1/025 |
| 2024/0157131 A1 * | 5/2024 | Deslauriers | A61N 1/06 |

* cited by examiner

USING CAPACITORS TO REGULATE CURRENT IN TRANSDUCER ARRAYS FOR APPLYING TUMOR TREATING FIELDS (TTFIELDS)

CROSS REFERENCE TO RELATED APPLICATIONS

This application claims the benefit of U.S. Provisional Application 63/216,678, filed Jun. 30, 2021, which is incorporated herein by reference in its entirety.

BACKGROUND

TTFields therapy is a proven approach for treating tumors. FIG. 1 is a schematic representation of the prior art Optune® system for delivering TTFields. The TTFields are delivered to patients via four transducer arrays 21-24 that are placed on the patient's skin in close proximity to a tumor (e.g., as depicted in FIGS. 2A-2D for a person with glioblastoma). The transducer arrays 21-24 are arranged in two pairs, and each transducer array is connected via a multi-wire cable to an AC signal generator 20. The AC signal generator (a) sends an AC current through one pair of arrays 21, 22 during a first period of time, which induces an electric field with a first direction through the tumor; then (b) sends an AC current through the other pair of arrays 23, 24 during a second period of time, which induces an electric field with a second direction through the tumor; then repeats steps (a) and (b) for the duration of the treatment.

Each transducer array 21-24 is configured as a set of capacitively coupled electrode elements E (e.g., a set of 9 electrode elements, each of which is about 2 cm in diameter) that are interconnected via a flex circuit. Each electrode element includes an electrically conductive substrate with a dielectric layer (more specifically, a layer of ceramic material with a high dielectric constant) disposed thereon. Each electrode element is sandwiched between a layer of an electrically conductive medical gel and an adhesive tape or bandage. When placing the arrays on the patient, the medical gel conforms to the contours of the patient's skin and ensures good electric contact of the device with the body. The adhesive tape or bandage holds the entire array in place on the patient as the patient goes about their daily activities.

When a first transducer array is positioned against a person's skin on one side of a person's body, and a second transducer array is positioned against the person's skin on the opposite side of the person's body, and an AC voltage is applied between the leads of the first and second transducer arrays, an electric current is capacitively coupled into the person's body. For TTFields to be effective, a sufficient amount of current must be capacitively coupled through the electrodes and into the person's body; and higher currents are strongly correlated with higher efficacy of treatment.

The electrically conductive medical gel and the skin under the ceramic elements heat up during use; and safety considerations require that the temperature measured at each of the ceramic elements remain below a specific safety threshold (e.g., 41° C.).

The amplitude of the alternating current that is delivered via the transducer arrays is controlled so that the temperature (as measured at the ceramic elements) will not exceed the safety threshold (e.g., 41° C.). The temperature measurements are obtained using thermistors T placed in the middle of some of the ceramic disks of the transducer arrays. In the existing Optune® system, each array includes 8 thermistors, each of which is positioned in a respective disk in the array. (Note that most arrays include more than 8 disks, in which case the temperature measurements are only performed beneath a sub-set of the disks within the array).

The AC signal generator 20 obtains temperature measurements from all 32 thermistors (4 arrays×8 thermistors per array), and the controller in the AC signal generator uses the temperature measurements to control the current to be delivered via each pair of arrays in order to maintain the temperatures below the safety threshold. The current itself is delivered to each array via an additional wire (i.e., one wire 28 for each of the arrays 21-24) that runs from the AC signal generator 20 to each array.

SUMMARY OF THE INVENTION

One aspect of the invention is directed to a first apparatus for applying an alternating electric field to a living subject. The first apparatus comprises a plurality of conductive regions, each of the conductive regions having a front face and a respective area. The plurality of conductive regions includes a plurality of first conductive regions and at least one second conductive region. The first apparatus further comprises a plurality of regions of dielectric material, each of which has (i) a respective front face and (ii) a respective rear face disposed against the front face of a corresponding one of the plurality of conductive regions. The first apparatus further comprises a substrate configured to hold the front faces of the plurality of regions of dielectric material on or in the subject's body and support the plurality of conductive regions at respective positions. The first apparatus further comprises a main conductor that is electrically connected to each second conductive region. The first apparatus still further comprises a plurality of capacitors, each of which has a respective first terminal electrically connected to a respective one of the first conductive regions and a respective second terminal electrically connected to the main conductor.

In some embodiments of the first apparatus, the respective positions are distributed about a centroid, and each of the first conductive regions is positioned more peripherally with respect to the centroid than each second conductive region. Optionally, in these embodiments, the first apparatus has at least four first conductive regions and at least five second conductive regions.

In some embodiments of the first apparatus, there are at least three first conductive regions and at least six second conductive regions. The respective positions are distributed in a pattern such that each of the first conductive regions is positioned at a given single end of the pattern, and none of the second conductive regions are positioned at the given single end of the pattern.

Another aspect of the invention is directed to a first method of reducing a spread of operating temperatures between (a) a plurality of first capacitively coupled electrode elements that are positioned on or in a subject's body and (b) at least one second capacitively coupled electrode element that is positioned on or in a subject's body. The first method comprises driving AC current through each of the plurality of first capacitively coupled electrode elements while a respective first capacitor is wired in series with each of the plurality of first capacitively coupled electrode elements; and driving AC current through the at least one second capacitively coupled electrode element.

In some instances of the first method, each of the plurality of first capacitively coupled electrode elements has a capacitance that is 2-5 times larger than the respective first capacitor.

Some instances of the first method further comprise supporting the plurality of first capacitively coupled electrode elements and the at least one second capacitively coupled electrode element at respective positions distributed about a centroid. In these instances, each of the first capacitively coupled electrode elements is positioned more peripherally with respect to the centroid than each second capacitively coupled electrode element.

In some instances of the first method, there are at least three first capacitively coupled electrode elements and at least six second capacitively coupled electrode elements. In these instances, the first method further comprises supporting the at least three first capacitively coupled electrode elements and the at least six second capacitively coupled electrode elements at respective positions. And the respective positions are distributed in a pattern such that each of the first capacitively coupled electrode elements is positioned at a given single end of the pattern, and none of the second capacitively coupled electrode elements are positioned at the given single end of the pattern.

Another aspect of the invention is directed to a second apparatus for applying an alternating electric field to a living subject. The second apparatus comprises a plurality of conductive regions, each of the conductive regions having a front face and a respective area. The plurality of conductive regions includes a plurality of first conductive regions and at least one second conductive region. The second apparatus further comprises a plurality of regions of dielectric material, each of which has (i) a respective front face and (ii) a respective rear face disposed against the front face of a corresponding one of the plurality of conductive regions. The second apparatus further comprises a substrate configured to hold the front faces of the plurality of regions of dielectric material on or in the subject's body and support the plurality of conductive regions at respective positions. The second apparatus still further comprises a plurality of first capacitors, each of which is electrically connected in series with a respective first conductive region.

In some embodiments of the second apparatus, the respective positions are distributed about a centroid, and each of the first conductive regions is positioned more peripherally with respect to the centroid than each second conductive region. Optionally, in these embodiments, there are at least four first conductive regions and at least five second conductive regions.

In some embodiments of the second apparatus, there are at least three first conductive regions and at least six second conductive regions. The respective positions are distributed in a pattern such that each of the first conductive regions is positioned at a given single end of the pattern, and none of the second conductive regions are positioned at the given single end of the pattern.

Some embodiments of the second apparatus further comprise a plurality of electronically controllable switches, each of which is (a) electrically connected in parallel with a respective one of the first capacitors and (b) controllable by a respective electrical signal.

In some embodiments of the second apparatus, each of the plurality of first capacitors is a variable capacitor whose capacitance is controllable by a respective electrical signal.

Some embodiments of the second apparatus further comprise a connector having a plurality of pins. The series connection between each of the plurality of first capacitors and the respective first conductive region passes through a respective pin of the connector.

In some embodiments of the second apparatus, the second apparatus has at least four first conductive regions, at least five second conductive regions, and at least four first capacitors.

In some embodiments of the second apparatus, the second apparatus has at least four first conductive regions, at least five second conductive regions, and at least four first capacitors, and the second apparatus further comprises at least four electronically controllable switches, each of which is (a) electrically connected in parallel with a respective one of the first capacitors and (b) controllable by a respective electrical signal. In these embodiments, each of the at least four first capacitors is a variable capacitor whose capacitance is controllable by a respective electrical signal.

In some embodiments of the second apparatus, the second apparatus has at least four first conductive regions, at least five second conductive regions, and at least four first capacitors, and the second apparatus further comprises a connector having at least four pins. The series connection between each of the at least four first capacitors and the respective first conductive region passes through a respective pin of the connector.

In some embodiments of the second apparatus, the second apparatus has at least four first conductive regions, at least five second conductive regions, and at least four first capacitors, and the second apparatus further comprises at least five second capacitors, each of which is electrically connected in series with a respective second conductive region.

In some embodiments of the second apparatus, the second apparatus has at least four first conductive regions, at least five second conductive regions, and at least four first capacitors, and the second apparatus further comprises at least five second capacitors, each of which is electrically connected in series with a respective second conductive region. These embodiments further comprise at least four electronically controllable switches, each of which is (a) electrically connected in parallel with a respective one of the first capacitors and (b) controllable by a respective electrical signal; and at least five electronically controllable switches, each of which is (a) electrically connected in parallel with a respective one of the second capacitors and (b) controllable by a respective electrical signal.

In some embodiments of the second apparatus, the second apparatus has at least four first conductive regions, at least five second conductive regions, and at least four first capacitors, and the second apparatus further comprises at least five second capacitors, each of which is electrically connected in series with a respective second conductive region. In these embodiments, each of the at least four first capacitors is a variable capacitor whose capacitance is controllable by a respective electrical signal, and each of the at least four second capacitors is a variable capacitor whose capacitance is controllable by a respective electrical signal.

Some embodiments of the second apparatus further comprise a plurality of thermistors, each of which is (a) positioned in thermal contact with a respective first conductive region and (b) configured to generate a respective first signal in response to a detected temperature. In these embodiments, each of the first capacitors is a variable capacitor having a respective capacitance-control input that receives a respective one of the first signals.

Some embodiments of the second apparatus further comprise a plurality of thermistors, each of which is (a) positioned in thermal contact with a respective first conductive region and (b) configured to generate a respective first signal in response to a detected temperature. Each of the first capacitors is a variable capacitor having a respective capacitance-control input that receives a respective one of the first signal. These embodiments have at least four first conductive regions, at least five second conductive regions, at least four first capacitors, and at least four thermistors.

Some embodiments of the second apparatus further comprise a plurality of thermistors, each of which is (a) positioned in thermal contact with a respective first conductive region and (b) configured to generate a respective first signal in response to a detected temperature. Each of the first capacitors is a variable capacitor having a respective capacitance-control input that receives a respective one of the first signal. These embodiments further comprise a plurality of resistors. Each thermistor has a first terminal connected to ground and a second terminal. One of the resistors is connected in series between the second terminal and a fixed voltage source. The second terminal of the thermistor is connected to the capacitance-control input of the respective first capacitor to provide the respective first signal having a voltage dependent on the detected temperature of the respective first conductive region.

Some embodiments of the second apparatus further comprise a plurality of thermistors, each of which is (a) positioned in thermal contact with a respective first conductive region and (b) configured to generate a respective first signal in response to a detected temperature. Each of the first capacitors is a variable capacitor having a respective capacitance-control input that receives a respective one of the first signal. These embodiments further comprise a plurality of resistors, each of which is connected in series with a respective one of the thermistors, so that a respective current flows through the respective one of the thermistors so as to generate a respective one of the first signals. Optionally, in these embodiments, the second apparatus has at least four first conductive regions, at least five second conductive regions, at least four first capacitors, at least four thermistors, and at least four resistors.

Another aspect of the invention is directed to a third apparatus for applying an alternating electric field to a living subject. The third apparatus comprises a plurality of conductive regions, each of the conductive regions having a front face and a respective area. The plurality of conductive regions includes a plurality of first conductive regions and at least one second conductive region. The third apparatus further comprises a plurality of regions of dielectric material, each of which has (i) a respective front face and (ii) a respective rear face disposed against the front face of a corresponding one of the plurality of conductive regions. The third apparatus further comprises a substrate configured to hold the front faces of the plurality of regions of dielectric material on or in the subject's body and support the plurality of conductive regions at respective positions. The third apparatus further comprises a connector having a plurality of first pins and at least one second pin. The third apparatus further comprises at least one conductor, each of which provides an electrically conductive path between a respective second pin and a respective second conductive region. The third apparatus still further comprises a plurality of capacitors, each of which has a respective first terminal electrically connected to a respective one of the first conductive regions and a respective second terminal electrically connected to a respective one of the first pins.

In some embodiments of the third apparatus, the respective positions are distributed about a centroid, and each of the first conductive regions is positioned more peripherally with respect to the centroid than each second conductive region. Optionally, in these embodiments, there are at least four first conductive regions, at least five second conductive regions, and at least five conductors.

In some embodiments of the third apparatus, there are at least three first conductive regions and at least six second conductive regions. In these embodiments, the respective positions are distributed in a pattern such that each of the first conductive regions is positioned at a given single end of the pattern, and none of the second conductive regions are positioned at the given single end of the pattern

DESCRIPTION OF THE PREFERRED EMBODIMENTS

Figure 1:
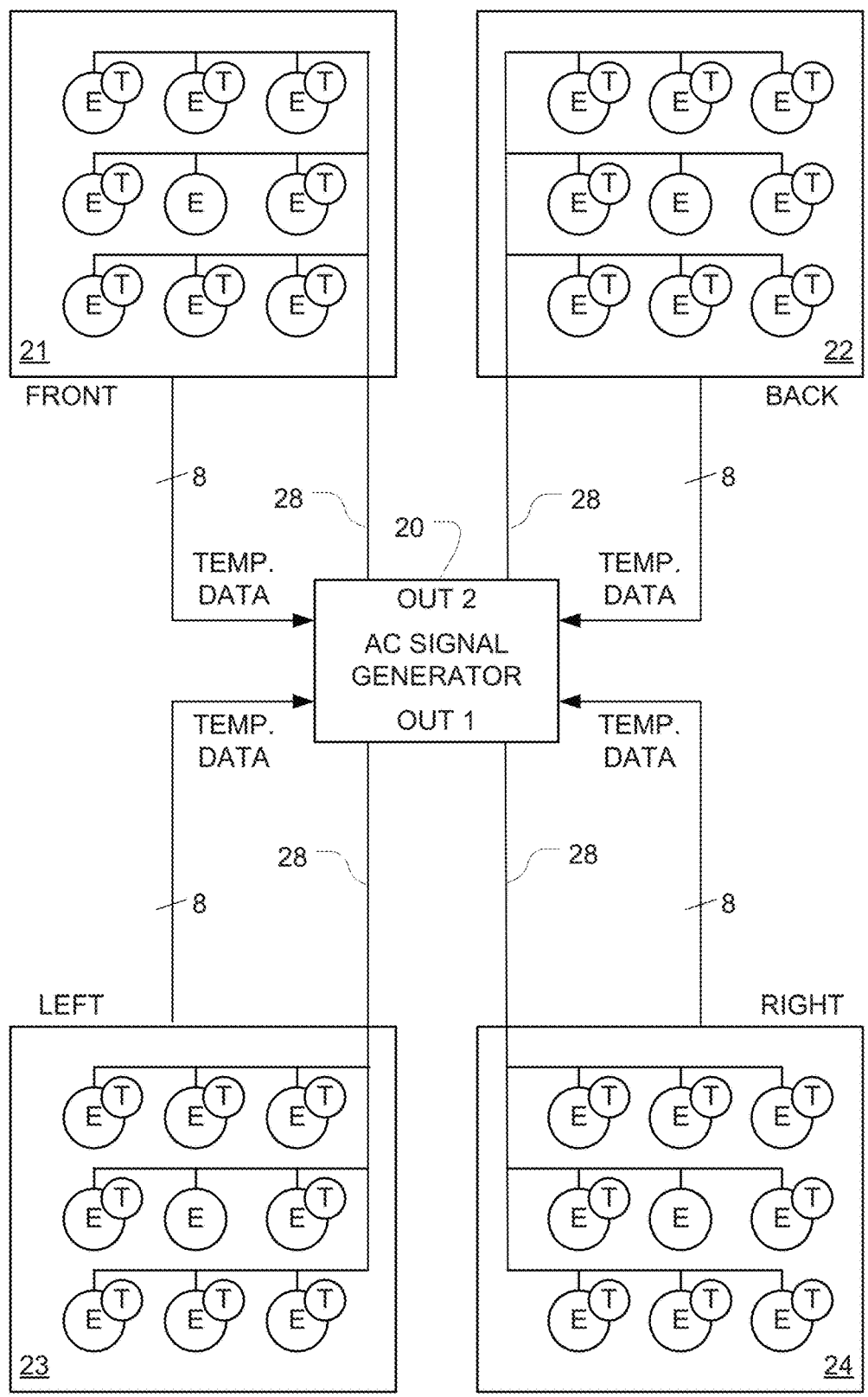
FIG. 1 is a schematic representation of the prior art Optune® system for delivering TTFields.

Upon examining temperature data captured from the 9 element 3×3 prior art transducer arrays in many anatomical contexts, the inventors recognized an interesting pattern. More specifically, the inventors obtained temperature data from 80 prior art transducer arrays when those arrays were used to apply TTFields to 20 randomly selected human subjects. Each transducer array had 9 ceramic elements arranged in a 3×3 array, and the construction of all the ceramic elements in any given transducer array was identical. The data included temperature measurements from individual ceramic elements within each transducer array (obtained using thermistors incorporated within the transducer arrays). The temperature measurement data was analyzed to determine which ceramic element within any given transducer array was the first to reach 41.1° C. (in which case a voltage reduction was needed to prevent that element from overheating above the regulatory threshold). This analysis revealed that over 90% of the time, the first ceramic element to reach 41.1° C. was one of the four corner elements. And notably, the difference in temperature between the hottest element and the coolest element in these cases was usually between 3 and 5° C. Computer simulations also suggest that the current flowing through the corner elements is higher than the non-corner elements.

The temperature measurement data was also analyzed to find the average temperature and standard deviation for each disc location. This analysis revealed that the average temperature for the four corner elements was 37.84° C. (standard deviation=1.32; N=639,413 temperature readings), while the average temperature for all non-corner elements that were measured was 37.14° C. (standard deviation=1.15; N=641,708 temperature readings). This means that, on average, the four corner elements ran 0.7° C. hotter than the measured non-corner elements.

As noted above, the corner elements tend to run hotter than the non-corner elements in many anatomical contexts. But in other anatomical contexts, a different set of electrode elements may tend to run hotter than the remaining electrode elements. For example, the elements at one end of the array may tend to run hotter than both (a) the electrode elements at the opposite end of the array and (b) the electrode elements in the middle of the array.

Whenever a given electrode element is operating below the safety threshold temperature, it is safe to increase the current that flows through that electrode element. If the current that flows through the lower-temperature elements is increased until the temperature at those elements reaches the safety threshold, the total treatment current will increase.

The embodiments described herein balance out the average expected temperature increase of the electrode elements in a given transducer array (as compared to the prior art transducer arrays) by preemptively reducing the current that flows through the electrode elements that tend to run hotter. In most anatomical contexts, this will be the more peripherally located electrode elements (e.g., the corner/end elements) of each transducer array. This enables a larger number of electrode elements in any given transducer array to operate closer to the safety threshold temperature, and increases the total treatment current that is delivered via the overall transducer array.

More specifically, the reduction in current is achieved by adding a respective capacitor connected in series with each of the electrode elements on the transducer array that tends to run hotter. These capacitors add impedance in series with the respective electrode elements that are expected to heat up at higher-than-average rates. As a result, the current that passes through those electrode elements is reduced, which in turn reduces the temperature for those electrode elements (so as to balance the temperatures of the electrode elements that tend to run hotter with the temperatures of the remaining elements). This balancing will make it possible to increase the total current that is handled by the overall transducer array, which can increase the efficacy of the treatment.

Figures 3A, 3B:
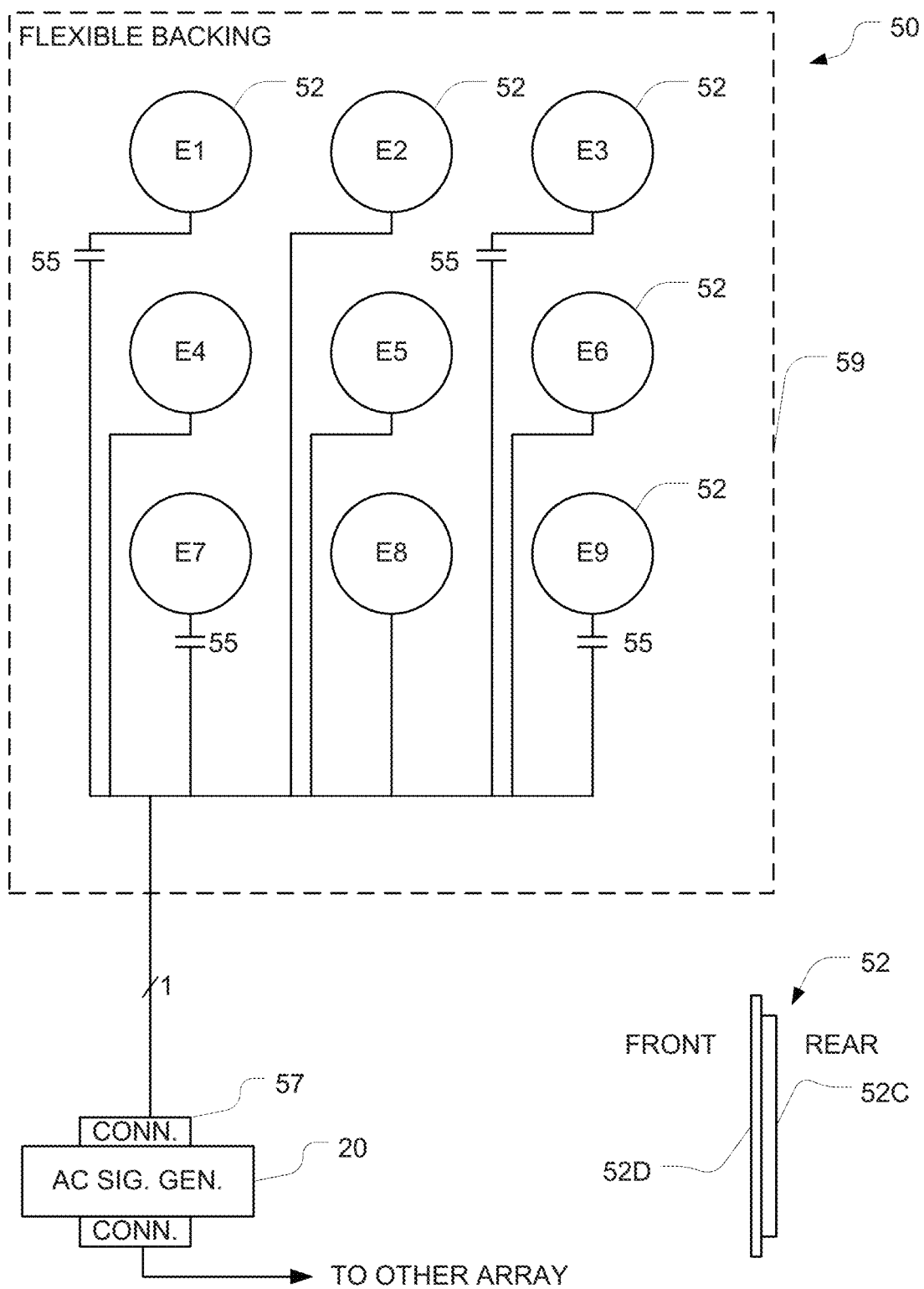
FIG. 3A is a schematic representation of a first embodiment of a transducer array that is used for applying TTFields to a subject's body.
FIG. 3B is a side view of a single electrode element in a transducer array.

FIG. 3A depicts a first embodiment of a transducer array 50 including a plurality of capacitively coupled electrode elements 52, which are labeled E1-E9 for ease of reference. Although FIG. 3A depicts nine electrode elements, that number can vary (e.g., between 6 and 50). As shown in FIG. 3B, which is a side view detail of a single electrode element 52 that applies to FIG. 3A (as well as FIGS. 4-10 discussed below), each of these electrode elements 52 has an electrically conductive region 52C with a region of dielectric material 52D disposed thereon. More specifically, each of the conductive regions 52C has a front face and a respective area, and each of the regions of dielectric material 52D has (i) a respective front face and (ii) a respective rear face disposed against the front face of a corresponding one of the plurality of conductive regions 52C. In some embodiments, each of these electrode elements 52 comprises a disk of ceramic material (which serves as the region of dielectric material 52D) with a metallization layer (which serves as the conductive region 52C) disposed on the rear face of the ceramic disk, which is similar to the construction of the prior art electrode elements used in the Optune® system. In alternative embodiments, different types of electrically conductive regions could be used (e.g., pads on a flex circuit), and different types of dielectric layers could be used (e.g., a layer of a polymer with a high dielectric constant such as Poly(VDF-TrFE-CtFE) and Poly(VDF-TrFE-CFE)). In some embodiments, the sum of the areas of all the conductive regions 52C is at least 25 $cm^2$, and in some embodiments, the sum of all those areas is at least 50 $cm^2$ or at least 100 $cm^2$.

A substrate 59 is configured to hold the front faces of the plurality of regions of dielectric material 52D of each electrode element 52 on or in the subject's body and support the plurality of conductive regions 52C at respective positions distributed about a centroid. Optionally, this substrate 59 may comprise a flexible backing (e.g., a layer of foam material). Preferably, a layer of hydrogel or conductive adhesive is disposed between the dielectric layer of the electrode elements 52 and the subject's body when the transducer array 50 is placed against the subject's body. Construction of the substrate 59 may be implemented using any of a variety of conventional approaches that will be apparent to persons skilled in the relevant arts, including but not limited to self-adhesive fabric, foam, or plastic sheeting.

In the FIG. 3A embodiment, the centroid of the conductive regions of the electrode elements E1-E9 happens to coincide with the center of electrode element E5. But when a different number of electrode elements are included in a transducer array, the centroid may not coincide with any of the electrode elements.

In the FIG. 3A embodiment, the conductive regions 52C are divided into two groups, referred to herein as first conductive regions and second conductive regions. The substrate 59 supports the electrode elements 52 so that each of the first conductive regions is positioned more peripherally with respect to the centroid than each second conductive region. In the embodiment illustrated in FIG. 3A, the conductive regions of each of the four corner elements 52 (i.e., E1, E3, E7, E9, which are positioned more peripherally) correspond to the first conductive regions, and the conductive regions of the other electrode elements 52 (i.e., E2, E4-6, and E8) correspond to the second conductive regions.

The transducer array 50 also includes a plurality of first capacitors 55, which are also supported by the substrate 59. Each of the capacitors 55 is electrically connected in series with a respective one of the first conductive regions (which correspond to the more peripherally located electrode elements). In the FIG. 3A embodiment, this is accomplished by wiring one terminal of each capacitor to a respective one of the first conductive regions and wiring the other terminal of each capacitor to a main conductor. In addition, in the FIG. 3A embodiment, each of the second conductive regions (i.e., which correspond to the more centrally located electrode elements) is also wired to the main conductor. Optionally (as illustrated in FIG. 3A), the main conductor is also connected to a connector 57 that connects the transducer array 50 to the AC signal generator 20 that drives the transducer array 50. Note that the wiring described herein may be implemented using one or more traces on a flex circuit and/or one or more conductive wires.

Each of the capacitors 55 adds a respective impedance in series with a respective one of the more peripherally located electrode elements (i.e., E1, E3, E7, and E9 in the illustrated embodiment). Accordingly, reduced currents will flow through those electrode elements (as compared to the prior art corner elements that do not include series capacitors). As a result of the reduced currents, electrode elements E1, E3, E7, E9 will not get as hot as the prior art corner elements that do not include series capacitors.

A set of experiments was performed to measure how positioning capacitors in series with the more peripherally located electrode elements impacts the spread of operating temperatures of the electrode elements within a given array of electrode elements. As a control, a pair of 3×3 arrays of capacitively coupled electrode elements from a prior art Optune® system were positioned on opposite sides of one thigh of live human test subjects, and 1.6 A of current was delivered through those arrays until the temperature on the arrays reached a steady-state. The capacitance of each electrode element in these arrays is 50 pF. For subject #1, the results were as follows (all values are in ° C.):

TABLE 1

|  | average temp of 4 corner elements | average temp of 5 non-corner elements | maximum temp of 4 corner elements | maximum temp of 5 non-corner elements | delta between averages | delta between maximums |
|---|---|---|---|---|---|---|
| Array #1 | 40.2 | 38.95 | 40.4 | 39.4 | 1.25 | 1 |
| Array #2 | 39.225 | 38.55 | 39.6 | 38.7 | 0.675 | 0.9 |

And for subject #2, the results were as follows (all values are in ° C.:

TABLE 2

|  | average temp of 4 corner elements | average temp of 5 non-corner elements | maximum temp of 4 corner elements | maximum temp of 5 non-corner elements | delta between averages | delta between maximums |
|---|---|---|---|---|---|---|
| Array #1 | 39.1 | 38.5 | 40 | 38.9 | 0.6 | 1.1 |
| Array #2 | 37.875 | 37.575 | 38.7 | 38.1 | 0.3 | 0.6 |

The same experiment was then repeated under identical conditions, except that each of the 3×3 arrays of capacitively coupled electrode elements from a prior art Optune® system was modified using four 17 pF capacitors (i.e., by adding one of the 17 pF capacitors in series with each of the four corner electrode elements, respectively). For subject #1, the results were as follows (all values are in ° C.):

TABLE 3

|  | average temp of 4 corner elements | average temp of 5 non-corner elements | maximum temp of 4 corner elements | maximum temp of 5 non-corner elements | delta between averages | delta between maximums |
|---|---|---|---|---|---|---|
| Array #1 | 39.85 | 39.825 | 40 | 40.2 | 0.025 | −0.2 |
| Array #2 | 38.4 | 38.95 | 39.4 | 39.3 | −0.55 | 0.1 |

And for subject #2, the results were as follows (all values are in ° C.):

TABLE 4

|  | average temp of 4 corner elements | average temp of 5 non-corner elements | maximum temp of 4 corner elements | maximum temp of 5 non-corner elements | delta between averages | delta between maximums |
|---|---|---|---|---|---|---|
| Array #1 | 38.6 | 38.425 | 38.9 | 39.1 | 0.175 | −0.2 |
| Array #2 | 38.3 | 38.55 | 39.1 | 38.9 | −0.25 | 0.2 |

When (a) the data in Table 1 is compared to the data in Table 3 and (b) the data in Table 2 is compared to the data in Table 4, it becomes clear that adding capacitors in series with the corner elements reduces the spread of operating temperatures between the electrode elements positioned at the corners of the array and the electrode elements that are not positioned at the corners of the array. This can ultimately enable a larger number of electrode elements in any given transducer array to operate closer to the safety threshold temperature, which means that the total treatment current that is delivered via a given overall transducer array can be increased, which advantageously increases the efficacy of treatment.

Note that the experiments described above in connection with Tables 1-4 used capacitively coupled electrode elements with a capacitance of 50 pF per element and 17 pF capacitors, which means that capacitance of the electrode elements was 3 times larger than the capacitance of the capacitors. But in alternative embodiments, the capacitance of the electrode elements can be between two and five times larger than the capacitance of the capacitors.

Preferably, each transducer array 50 also includes temperature sensors (e.g., thermistors, not shown) in thermal contact with the electrode elements 52. These sensors sense the temperatures of the electrode elements and send corresponding signals via additional wires (not shown) in the connector 57 to the field generator that drives the transducer array 50. This may be done using the same approach that is used in the Optune® prior art system, in which case the transducer array 50 of FIG. 3A will be reverse compatible with the prior art Optune® AC signal generator 20 shown in FIG. 1. Any of a variety of alternative approaches for sensing the temperatures of the electrode elements and reporting those temperatures to the system 20 that drives the transducer array 50 can also be used. However, if an alternative temperature sensing/reporting approach is used, the transducer array 50 may no longer be compatible with the prior art Optune® AC signal generator.

Figure 4:
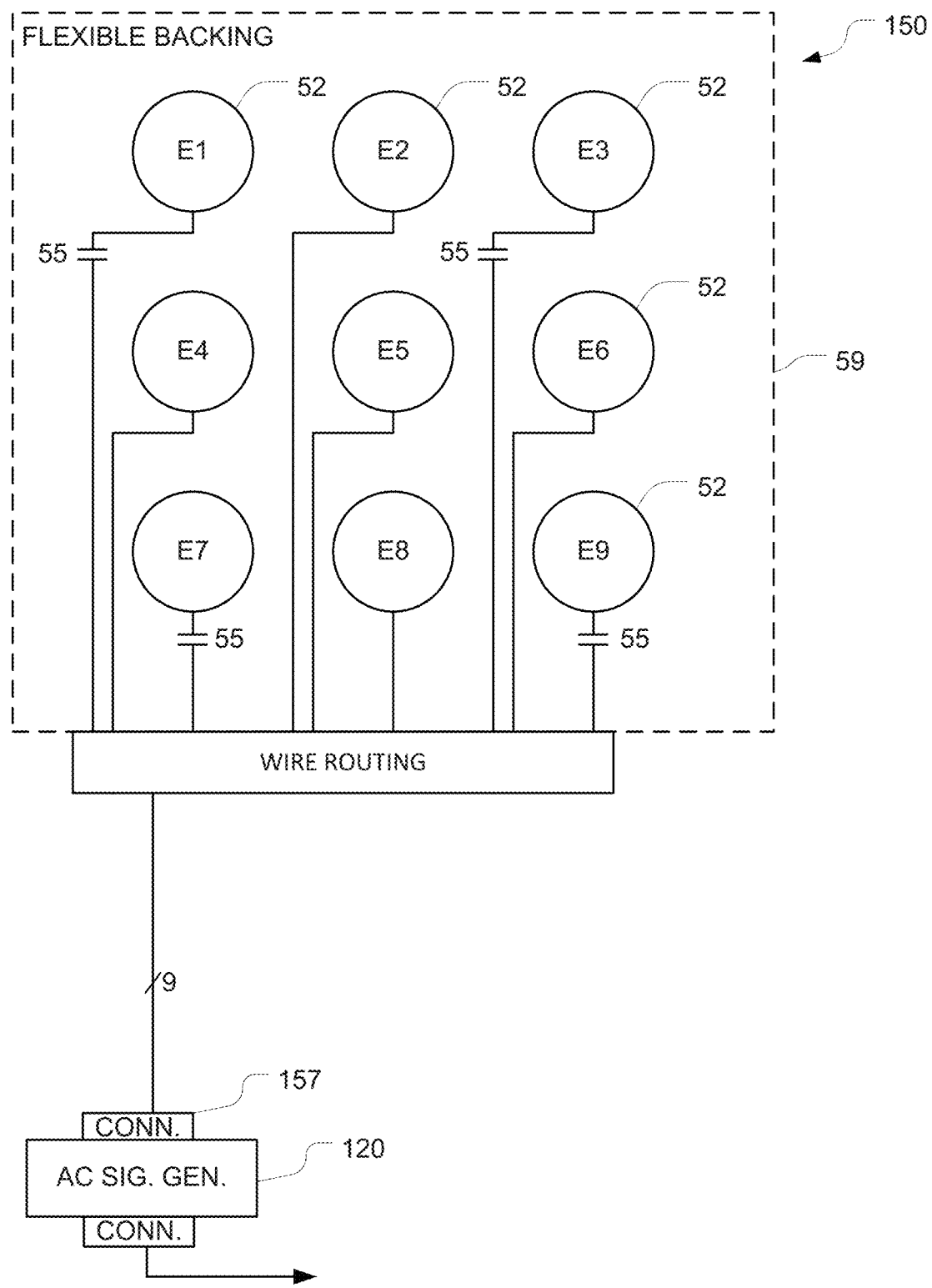
FIG. 4 is a schematic representation of a second embodiment of a transducer array that is used for applying TTFields to a subject's body.

FIG. 4 depicts a second embodiment of a transducer array 150 that includes a plurality of capacitively coupled electrode elements 52, which are labeled E1-E9. As in the FIG. 3A embodiment, the number of electrode elements can vary. As described above in connection with FIG. 3A/3B, each of these electrode elements 52 has an electrically conductive region 52C with a region of dielectric material 52D disposed thereon. More specifically, each of the conductive regions 52C has a front face and a respective area, and each of the regions of dielectric material 52D has (i) a respective front face and (ii) a respective rear face disposed against the front face of a corresponding one of the plurality of conductive regions. The sum of the areas of all the conductive regions may be at least 25 cm$^2$, at least 50 cm$^2$, or at least 100 cm$^2$, as described above in connection with FIG. 3A/3B.

The conductive regions 52C are divided into the same two groups described above in connection with FIG. 3A/3B. And a substrate 59 supports the electrode elements 52 at respective positions distributed about a centroid, as described above in connection with FIG. 3A.

The transducer array 150 also includes a plurality of first capacitors 55, which are also supported by the substrate 59. Each of the capacitors 55 is electrically connected in series with a respective one of the first conductive regions (which correspond to the more peripherally located electrode elements 52). In the FIG. 4 embodiment, this is accomplished using a connector 157 that has a plurality of first pins and at least one second pin. Each of the capacitors 55 has a respective first terminal electrically connected to a respective one of the first conductive regions and a respective second terminal electrically connected to a respective one of the first pins. At least one conductor is also provided, each of which provides an electrically conductive path between a respective second pin and a respective second conductive region. The wiring described herein may be implemented using one or more traces on a flex circuit and/or one or more conductive wires.

Notably, because each of the electrode elements 52 (E1-E9) in this FIG. 4 embodiment is driven by its own dedicated wire, alternative approaches for reducing the temperature of any given electrode element (E1-E9) can be used in combination with the series-capacitor based approach for reducing the temperature of the corner elements (E1, E3, E7, E9). For example, if a given electrode element is running hotter than the other electrode elements, the AC signal generator 120 could reduce the duty cycle of the signal that is applied to the given element to cool it down, regardless of whether the given element is a corner element or a non-corner element.

An AC signal generator 120 provides one polarity of an AC signal to each pin of the connector 157, and the other polarity of the AC signal to each pin of a corresponding connector that feeds another, separate, transducer array 150, which may be identical.

As in the FIG. 3A embodiment described above, each of the capacitors 55 in this FIG. 4 embodiment adds a respective impedance in series with a respective one of the more peripherally located electrode elements. Accordingly, reduced currents will flow through those electrode elements, so they will not get as hot as the prior art corner elements that do not include series capacitors. Preferably, each transducer array 150 also includes temperature sensors (e.g., thermistors, not shown, as described above in connection with FIG. 3A).

Figure 5:
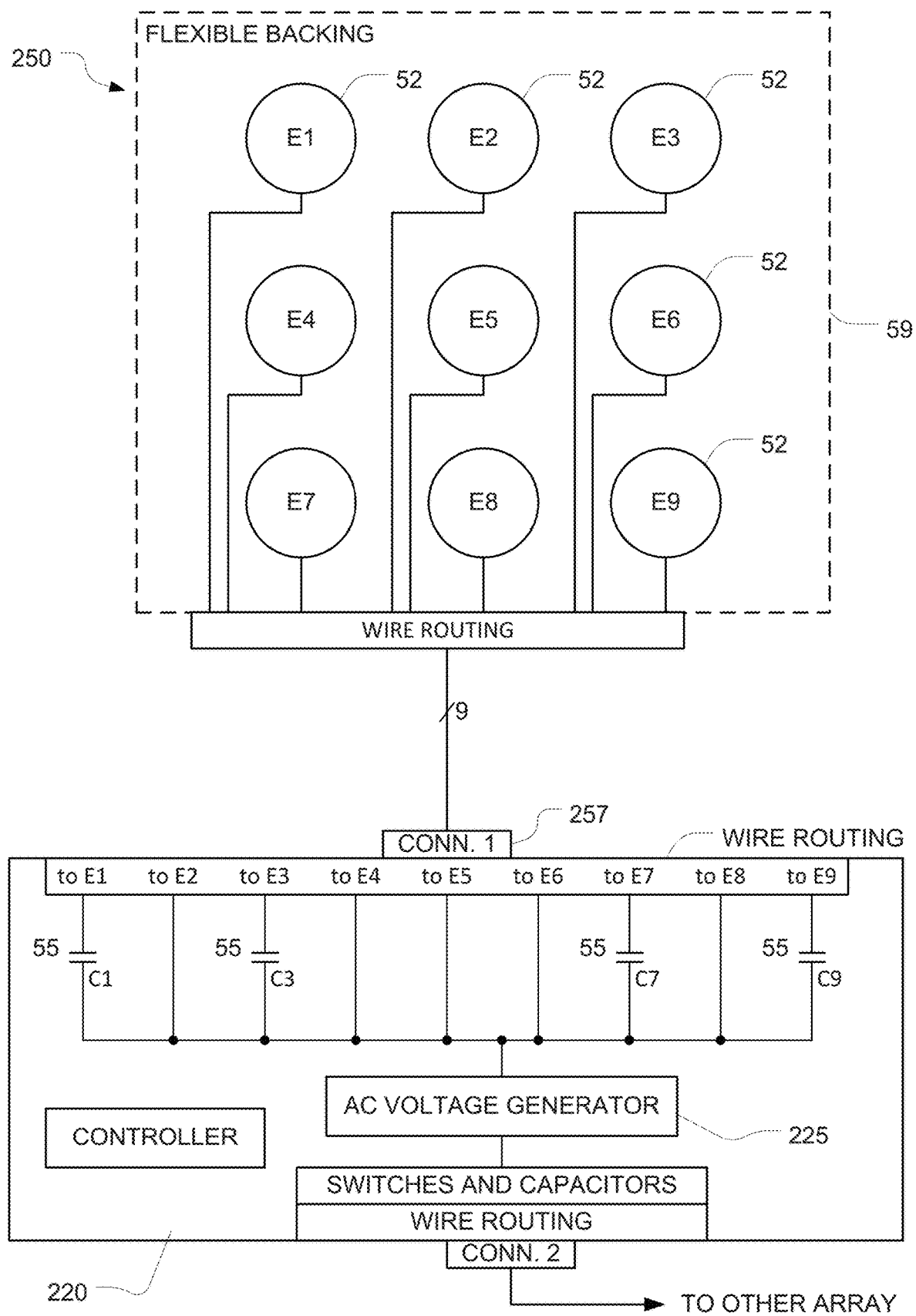
FIG. 5 is a block diagram of a system including a third embodiment of a transducer array that is used for applying TTFields to a subject's body.

FIG. 5 depicts a third embodiment of a transducer array 250 that includes a plurality of capacitively coupled electrode elements 52, which are labeled E1-E9. As in the FIG. 3A embodiment, the number of electrode elements can vary. As described above in connection with FIG. 3A/3B, each of these electrode elements 52 has an electrically conductive region 52C with a region of dielectric material 52D disposed thereon. More specifically, each of the conductive regions 52C has a front face and a respective area, and each of the regions of dielectric material 52D has (i) a respective front face and (ii) a respective rear face disposed against the front face of a corresponding one of the plurality of conductive regions. The sum of the areas of all the conductive regions may be at least 25 cm$^2$, at least 50 cm$^2$, or at least 100 cm$^2$, as described above in connection with FIG. 3A/3B.

The conductive regions 52C are divided into the same two groups described above in connection with FIG. 3A/3B. And a substrate 59 supports the electrode elements 52 at respective positions distributed about a centroid, as described above in connection with FIG. 3A.

This FIG. 5 embodiment also includes a plurality of first capacitors 55. But instead of positioning the capacitors 55 on the transducer array (supported by the substrate 59) as described above for the FIG. 3A and FIG. 4 embodiments, the capacitors 55 in this FIG. 5 embodiment reside within the AC signal generator 220 (i.e., on the opposite side of the connector 57/257). Each of the first conductive regions and each of the second conductive regions of the transducer array 250 is wired to its own individual pin of the connector 257. And each of the capacitors 55 is electrically connected in series with a respective one of the pins that feeds one of the first conductive regions (which correspond to the more peripherally located electrode elements). For example, in the FIG. 5 embodiment, electrode elements E1, E3, E7, and E9 correspond to the first conductive regions, and capacitors C1, C3, C7, and C9 are wired in series with the pins of connector 257 that feeds those first conductive regions.

An AC signal generator 220 includes an AC voltage generator 225 that provides one polarity of an AC signal to the lower terminal of each of C1, C3, C7, and C9, and also provides that same polarity of the AC signal directly to the pins of the connector 257 that feed each of the second conductive regions (i.e., corresponding to electrode elements E2, E4, E5, E6, and E8). The other polarity of the AC signal is provided to corresponding pins of a corresponding connector that feeds a second transducer array (not shown) which may be identical, with corresponding capacitors wired in series with those pins that feed each of the first conductive regions (which correspond to the corner elements) of the second (identical) transducer array.

As in the FIG. 3A embodiment described above, each of the capacitors 55 in this FIG. 5 embodiment adds a respective impedance in series with a respective one of the more peripherally located electrode elements 52. Accordingly, reduced currents will flow through those electrode elements, so they will not get as hot as the prior art corner elements that do not include series capacitors. Preferably, each transducer array 250 also includes temperature sensors (e.g., thermistors, not shown, as described above in connection with FIG. 3A).

Figure 6:
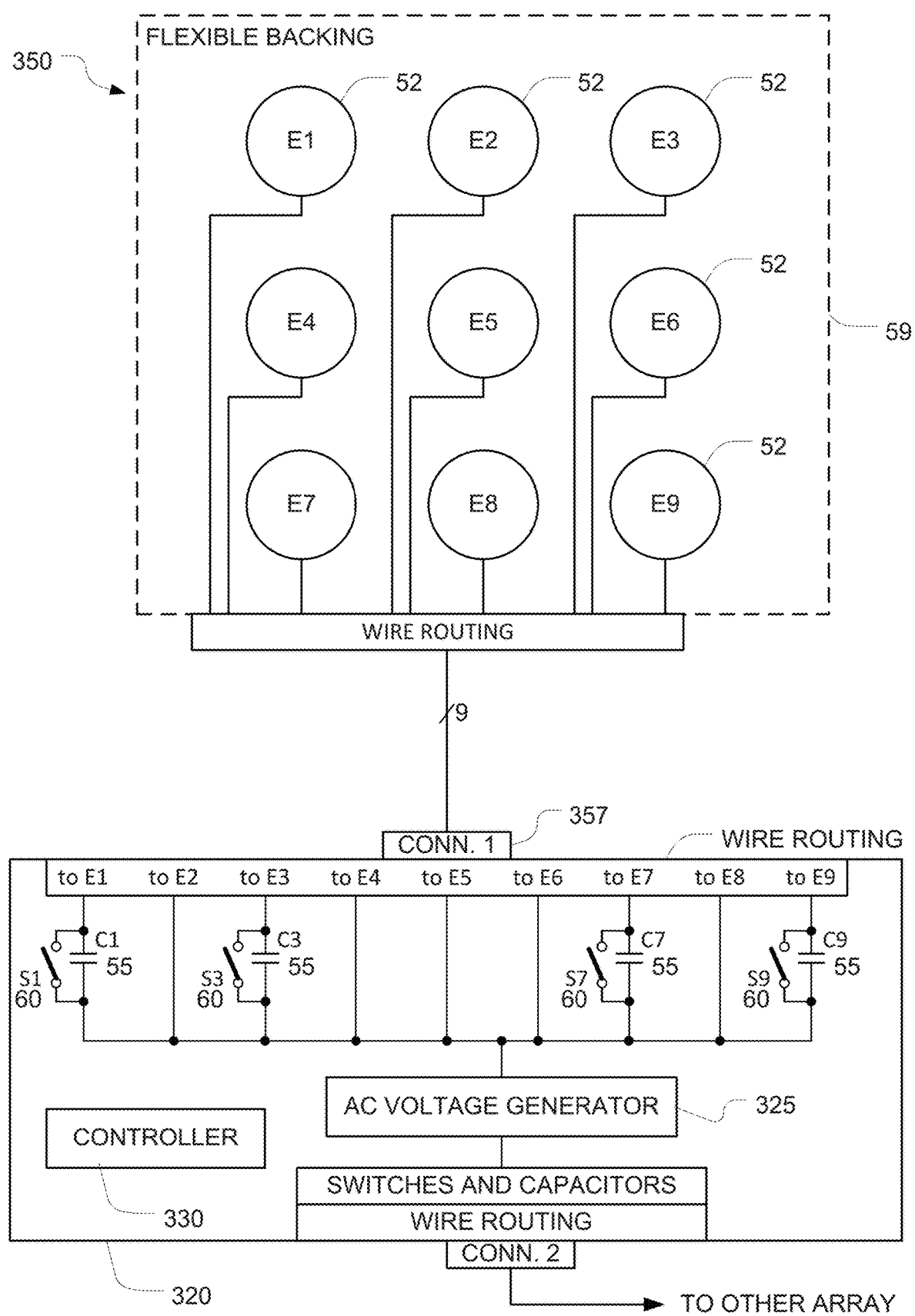
FIG. 6 is a block diagram of a system including a fourth embodiment of a transducer array that is used for applying TTFields to a subject's body.

FIG. 6 depicts a fourth embodiment of a transducer array 350 that includes a plurality of capacitively coupled electrode elements 52 (labelled E1-E9). This FIG. 6 embodiment is similar to the FIG. 5 embodiment described above (i.e., with the capacitors 55 residing within the AC signal generator 320 and each capacitor connected and wired as described for the FIG. 5 embodiment), except that an electronically controlled switch 60 is wired in parallel with each of the capacitors 55 (C1, C3, C7, and C9), and a controller 330 controls the state of each of these switches 60 (labelled S1, S3, S7, and S9 corresponding to the four capacitors C1, C3, C7, and C9).

As in the FIG. 5 embodiment described above, each of the capacitors 55 in this FIG. 6 embodiment adds a respective impedance in series with a respective one of the more peripherally located electrode elements. Accordingly, reduced currents will flow through those electrode elements, so they will not get as hot as the prior art corner elements that do not include series capacitors.

Preferably, each transducer array 350 also includes temperature sensors (e.g., thermistors, not shown, associated with the electrode elements 52 and supported by the substrate 59 as described above in connection with FIG. 3A). The controller 330 may control the state of each of the switches 60 based on data received from the temperature sensors. For example, the controller 330 may default to an initial condition in which all the switches 60 are open. Subsequently, if the controller 330 detects that one of the corner electrode elements 52 is sufficiently cool so that it can handle more current, the controller 330 can close a corresponding one of the switches 60. This will introduce a low impedance path in parallel with the respective capacitor 55, which will increase the current to the respective electrode element 52.

The AC signal generator 320, AC voltage generator 325, and Connector 357 function as described for the corresponding elements 220, 225 and 257 discussed above in connection with FIG. 5.

Figure 7:
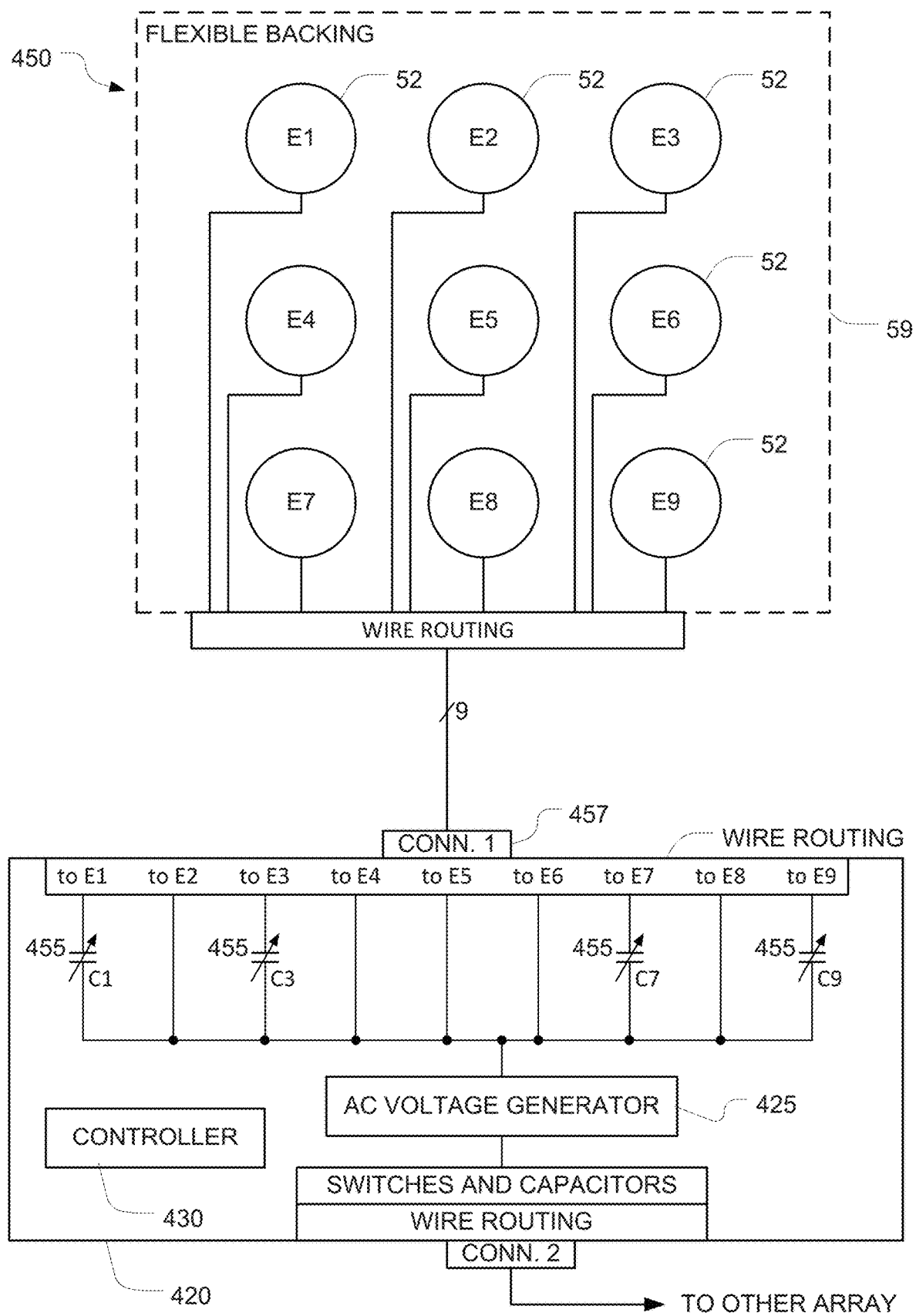
FIG. 7 is a block diagram of a system including a fifth embodiment of a transducer array that is used for applying TTFields to a subject's body.

FIG. 7 depicts a fifth embodiment of a transducer array 450 that includes a plurality of capacitively coupled electrode elements 52 (labelled E1-E9). This FIG. 7 embodiment is similar to the FIG. 5 embodiment described above (i.e., with the variable capacitors 455 residing within the AC signal generator 420, and with each capacitor connected and wired as described for the FIG. 5 embodiment), except that each of the capacitors 55 in FIG. 5 is replaced by a variable capacitor 455 (C1, C3, C7, and C9), and a controller 430 controls the capacitance of each of these variable capacitors 455.

As in the FIG. 5 embodiment described above, each of the variable capacitors 455 in this FIG. 7 embodiment adds a respective impedance in series with a respective one of the more peripherally located electrode elements 52. Accordingly, reduced currents will flow through those electrode elements, so they will not get as hot as the prior art corner elements that do not include series capacitors.

Preferably, each transducer array 450 also includes temperature sensors (e.g., thermistors, not shown, associated with the electrode elements 52 and supported by the substrate 59 as described above in connection with FIG. 3A). The controller 430 may control the state of each of the variable capacitors 455 based on data received from the temperature sensors. For example, the controller 430 may default to an initial condition in which all the variable capacitors 455 are set to their minimum capacitance, which provides the highest series impedance. Subsequently, if the controller 430 detects that one of the corner electrode elements 52 is sufficiently cool so that it can handle more current, the controller 430 can increase the capacitance of the corresponding variable capacitor 455. This will reduce the impedance of the variable capacitor 455, which will increase the current to the respective electrode element 52.

The AC signal generator 420, AC voltage generator 425, and Connector 457 function as described for the corresponding elements 220, 225 and 257 discussed above in connection with FIG. 5.

Figure 8:
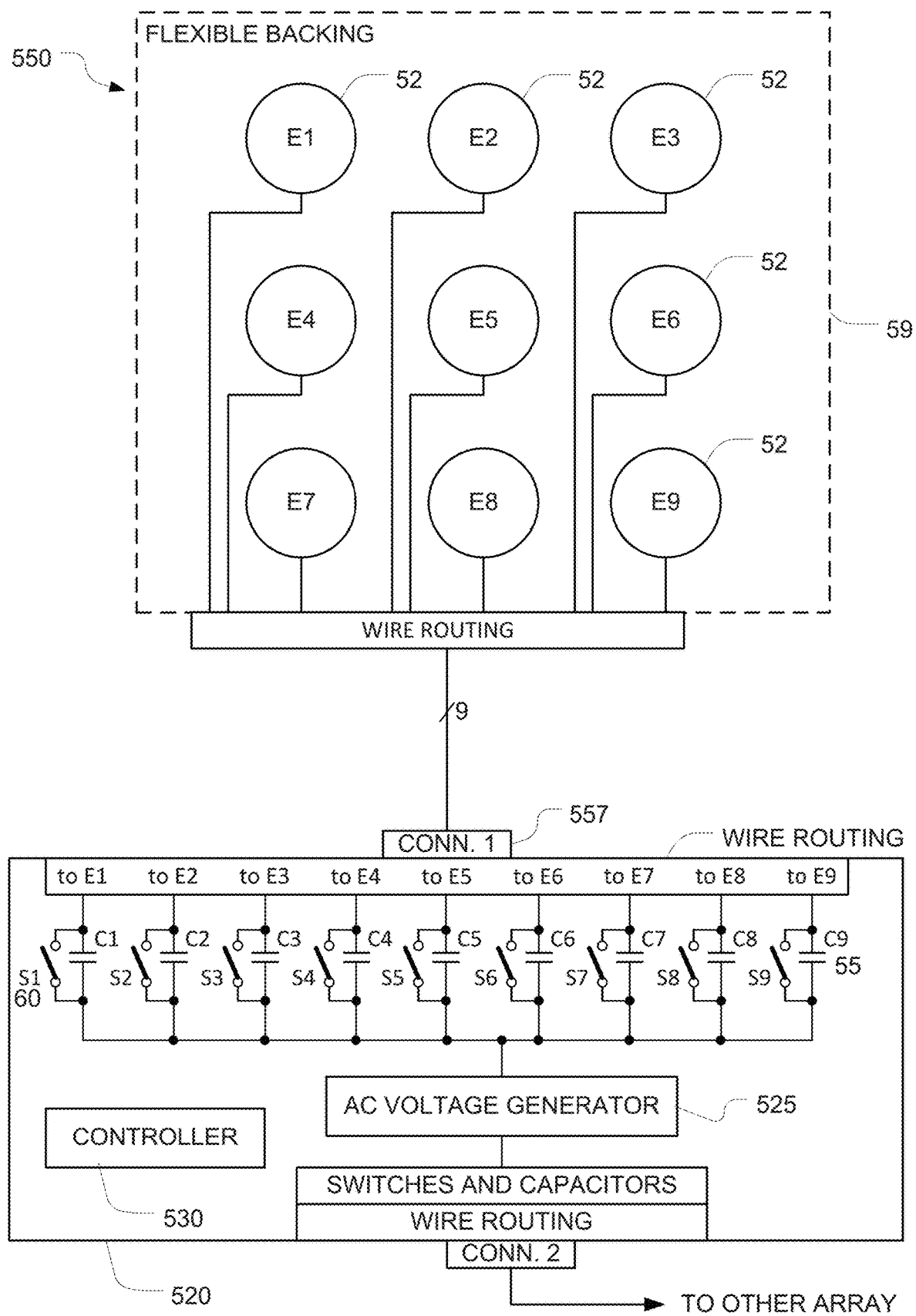
FIG. 8 is a block diagram of a system including a sixth embodiment of a transducer array that is used for applying TTFields to a subject's body.

FIG. 8 depicts a sixth embodiment of a transducer array 550 that includes a plurality of capacitively coupled electrode elements 52 (labelled E1-E9). This FIG. 8 embodiment is similar to the FIG. 6 embodiment described above (i.e., with the capacitors 55 residing within the AC signal generator 520 and each capacitor connected and wired as described for the FIG. 5 embodiment), except that in addition to the plurality of first capacitors 55 that are electrically connected in series with respective first conductive regions (with a corresponding electronically controlled switch 60 wired in parallel with each capacitor 55), this embodiment also includes a plurality of second capacitors 55 that are electrically connected in series with respective second conductive regions (with a corresponding electronically controlled switch 60 wired in parallel with each capacitor 55). Accordingly, in the example embodiment depicted in FIG. 8, there are nine electrode elements (labelled E1-E9), nine capacitors 55 (labelled C1-C9), and nine electrically controlled switches 60 (labelled S1-S9), each of which is wired in parallel with a respective one of the capacitors 55. This gives the controller 530 control over the impedances that lead to all of the electrode elements 52 (as opposed to only controlling the impedances that lead to the more peripherally located electrode elements 52).

Preferably, each transducer array 550 also includes temperature sensors (e.g., thermistors, not shown, associated with the electrode elements 52 and supported by the substrate 59 as described above in connection with FIG. 3A). The controller 530 may control the state of each of the switches 60 based on data received from the temperature sensors. For example, the controller 530 may default to an initial condition in which all the switches 60 are open. Subsequently, if the controller 530 detects that any electrode element 52 is sufficiently cool so that it can handle more current, the controller 530 can close a corresponding one of the switches 60. This will introduce a low impedance path in parallel with the respective capacitor 55, which will increase the current to the respective electrode element 52.

Each of the capacitors 55 in this FIG. 8 embodiment adds a respective impedance in series with a respective one of the electrode elements. The controller 530 can therefore selectively add impedance to those paths that lead to the first conductive regions (i.e., the more peripherally located regions) in order to reduce the current that flows through the corresponding electrode elements 52, which will lead to a corresponding reduction in temperature.

The AC signal generator 520, AC voltage generator 525, and Connector 557 function as described for the corresponding elements 220, 225 and 257 discussed above in connection with FIG. 5.

Figure 9:
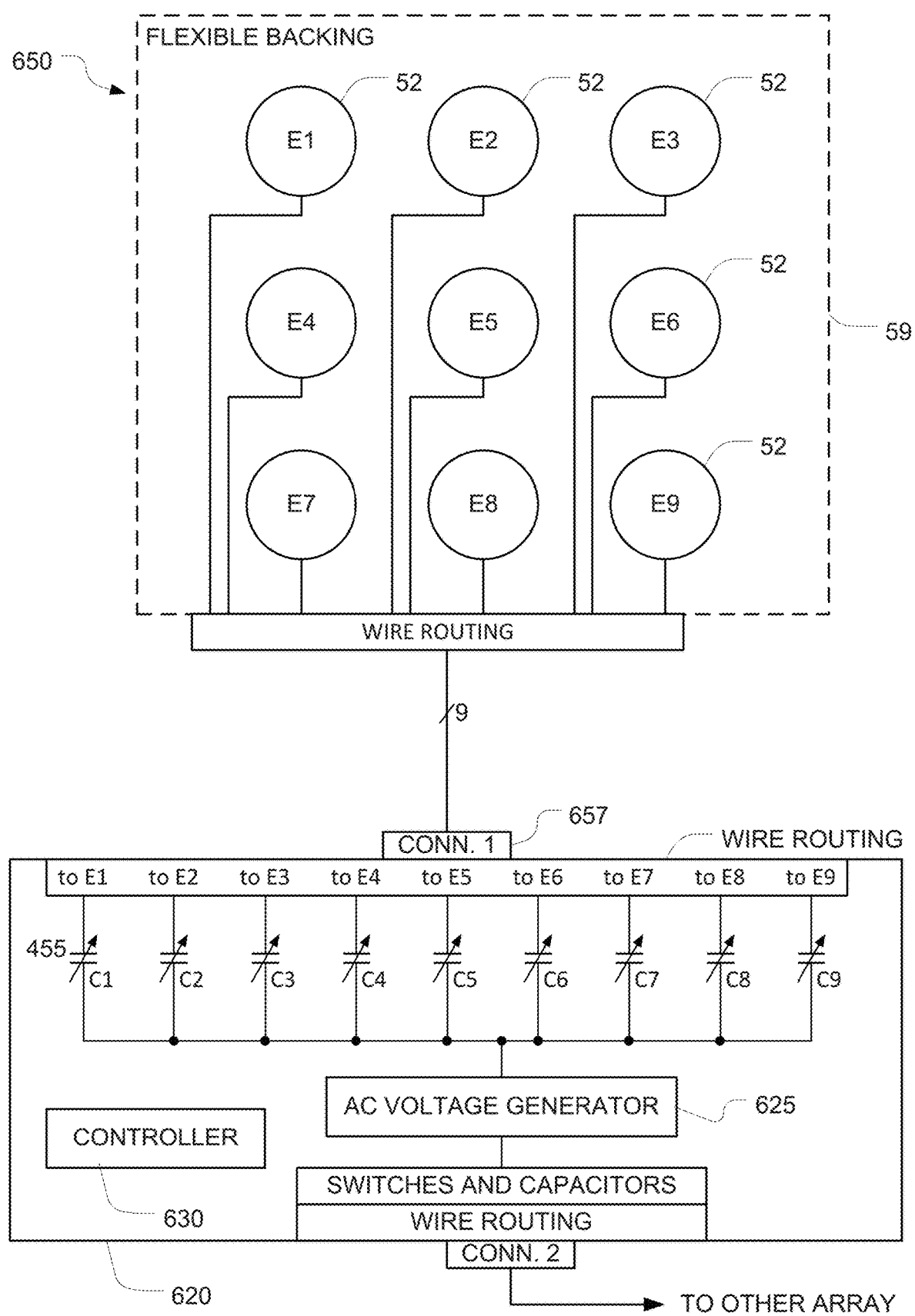
FIG. 9 is a block diagram of a system including a seventh embodiment of a transducer array that is used for applying TTFields to a subject's body.

FIG. 9 depicts a seventh embodiment of a transducer array 650 that includes a plurality of capacitively coupled electrode elements 52 (labelled E1-E9). This FIG. 9 embodiment is similar to the FIG. 7 embodiment described above (i.e., with the variable capacitors 455 residing within the AC signal generator 620 and each capacitor connected and wired as described in connection with the FIG. 5 embodiment), except that in addition to the plurality of first variable capacitors 455 that are electrically connected in series with respective first conductive regions, this embodiment also includes a plurality of second variable capacitors 455 that are electrically connected in series with respective second conductive regions. Accordingly, in the example embodiment depicted in FIG. 9, there are nine electrode elements (labelled E1-E9) and nine variable capacitors 455 (labelled C1-C9). This gives the controller 630 control over the impedances that lead to all of the electrode elements 52 (as opposed to only controlling the impedances that lead to the more peripherally located electrode elements 52).

Preferably, each transducer array 650 also includes temperature sensors (e.g., thermistors, not shown, associated with the electrode elements 52 and supported by the substrate 59 as described above in connection with FIG. 3A). The controller 630 may control the state of each of the variable capacitors 455 based on data received from the temperature sensors. For example, the controller 630 may default to an initial condition in which all the variable capacitors 455 are set to their minimum capacitance, which provides the highest series impedance. Subsequently, if the controller 630 detects that one of the corner electrode elements 52 is sufficiently cool so that it can handle more current, the controller 630 can increase the capacitance of the corresponding variable capacitor 455. This will reduce the impedance of the variable capacitor 455, which will increase the current to the respective electrode element 52.

Each of the variable capacitors 455 in this FIG. 9 embodiment adds a respective impedance in series with a respective one of the electrode elements 52. The controller 630 can therefore selectively add impedance to those paths that lead to the first conductive regions (i.e., the more peripherally located regions) in order to reduce the current that flows through the corresponding electrode elements 52, which will lead to a corresponding reduction in temperature.

The AC signal generator 620, AC voltage generator 625, and Connector 657 function as described for the corresponding elements 220, 225 and 257 discussed above in connection with FIG. 5.

Figure 10:
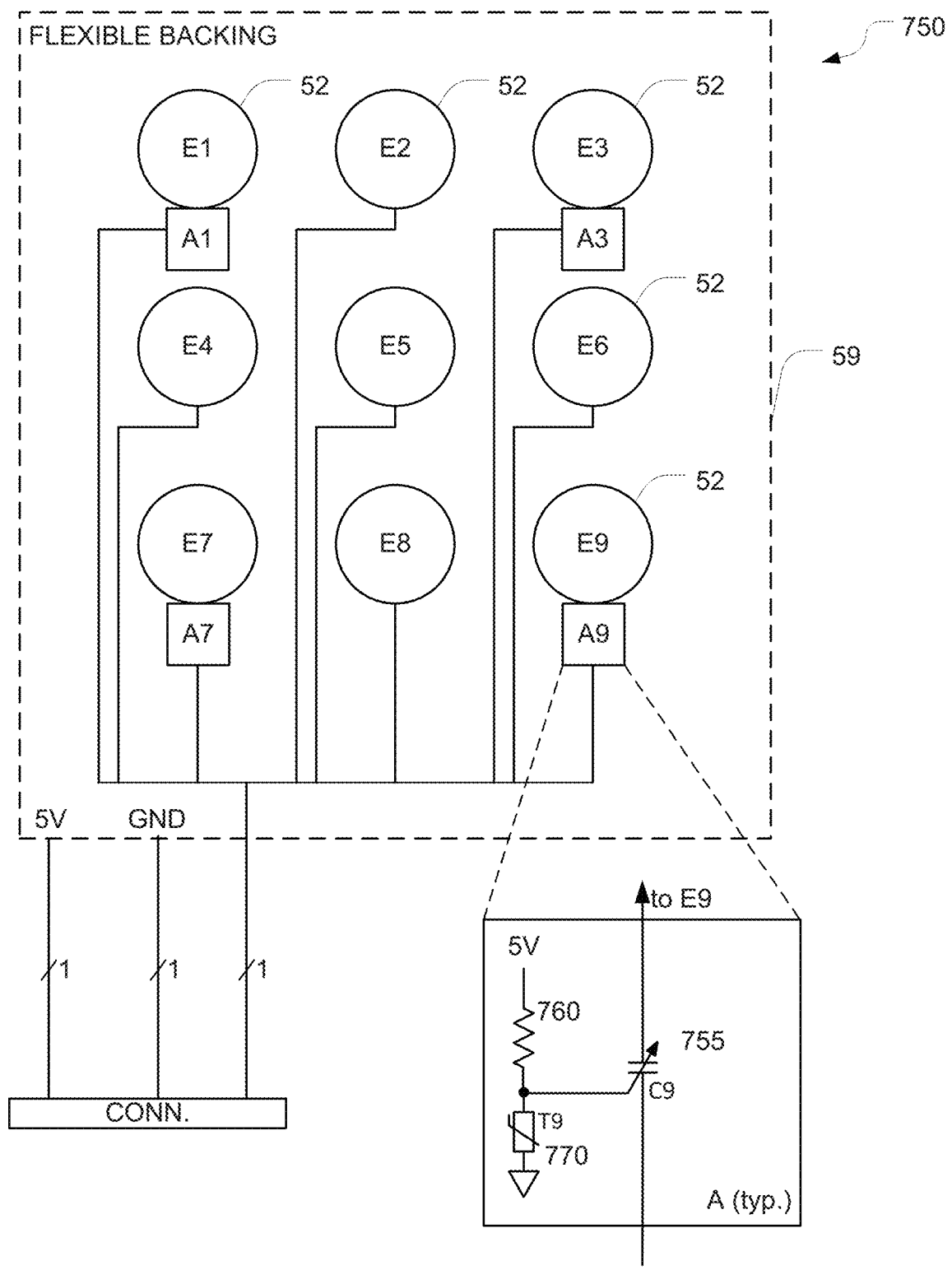
FIG. 10 is a schematic representation of an eighth embodiment of a transducer array that is used for applying TTFields to a subject's body.

FIG. 10 depicts an eighth embodiment of a transducer array 750 that includes a plurality of capacitively coupled electrode elements 52 (labelled E1-E9). This FIG. 10 embodiment is similar to the FIG. 3A embodiment described above, except that the fixed capacitors 55 in the FIG. 3A embodiment are replaced with variable capacitors 755, and a thermistor-based circuit (shown as A1, A3, A7, and A9 at electrode elements E1, E3, E7, and E9, respectively) is used to automatically adjust the capacitance of the variable capacitors 755 based on the temperature of the respective electrode elements. One example of a circuit that is suitable for implementing each of the thermistor-based circuits A1, A3, A7, and A9 is depicted in the inset on the lower right corner of FIG. 10, and labeled A(typ.). But a variety of alternative circuits may be used instead of the A(typ.) circuit to control the series capacitance.

In the illustrated embodiment, each thermistor-based circuit includes a thermistor 770 (e.g., a positive temperature coefficient thermistor, shown as T9 in the inset of FIG. 10) positioned in thermal contact with a respective one of the electrode elements 52. Each thermistor 770 is wired in series with a pull-up resistor 760, so that the voltage at the node between any given thermistor 770 and its corresponding resistor 760 will increase when the temperature of the thermistor 770 increases. The signal at this node controls the capacitance of the variable capacitor 755 (shown as C9 in the inset of FIG. 10). For example, the variable capacitor 755 can be a Murata LXRWOYV201-059, with a capacitance that varies from 200 pF (when the control signal is 0 V) to 100 pF (when the control signal is 3 V).

Assume that a given electrode element starts out at a low temperature. This will result in a relatively low voltage at the control node, which will result in a relatively high capacitance for the variable capacitor 755. This relatively high capacitance will result in a relatively low series impedance, which will initially allow a full measure of current to reach the electrode element 52.

Now let us assume that the full measure of current causes one of the electrode elements 52 to heat up. Because the corresponding thermistor 770 is in thermal contact with the electrode element 52, it will heat up, which will raise the voltage on the control node. This increase in voltage will cause the capacitance of the variable capacitor 755 to go down, which means that the impedance of the variable capacitor 755 will go up. And this increase in impedance in the variable capacitor 755 will reduce the amount of current that flows through the electrode element 52 until an equilibrium is reached. The value of the resistor 760 and the nominal value of the thermistor 770 may be selected so that the equilibrium point is below 41° C.

Notably, this FIG. 10 embodiment automatically adjusts the capacitance of the variable capacitors 755 that are wired in series with the corner elements E1, E3, E7, E9 to reduce the spread of operating temperatures between the corner elements (which are expected to run hotter than the other elements) and the non-corner elements. But in alternative embodiments, copies of the circuit depicted in the inset of FIG. 10 are included in series with all of the electrode elements E1-E9, in which case the heating up of *any* given electrode element (as opposed to just the corner elements) will decrease the capacitance (and thereby increase the impedance) of the respective variable capacitor 755 that is wired in series with the given element. And this increase in impedance will reduce the amount of current that flows through the given electrode element until an equilibrium is reached. These alternative embodiments therefore provide automatic current regulation for all of the electrode elements E1-E9 (as opposed to just the corner elements).

As explained above, the corner elements tend to run hotter than the non-corner elements in many anatomical contexts. And in these contexts, wiring capacitors in series with the corner elements as described above will reduce the spread of operating temperatures between the corner elements and the non-corner elements. But in certain specific anatomical contexts, it is not the corner elements that tend to run hotter than the other elements. Instead, in these anatomical contexts, electrode elements at one end of the array tend to run hotter than both the electrode elements at the opposite end of the array and the electrode elements in the middle of the array.

Figure 2A:
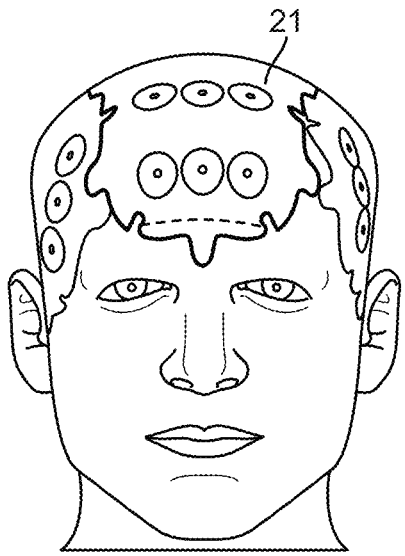
FIGS. 2A-2D depict the positioning of transducer arrays on a person's head for treating a brain tumor.
Figure 2B:
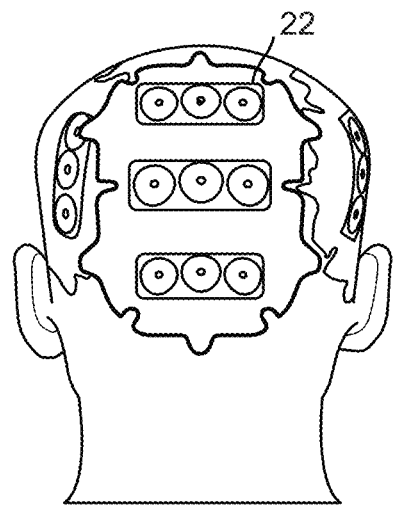
Figure 2C:
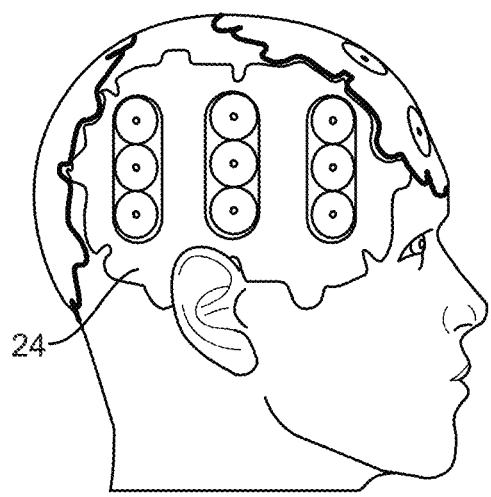
Figure 2D:
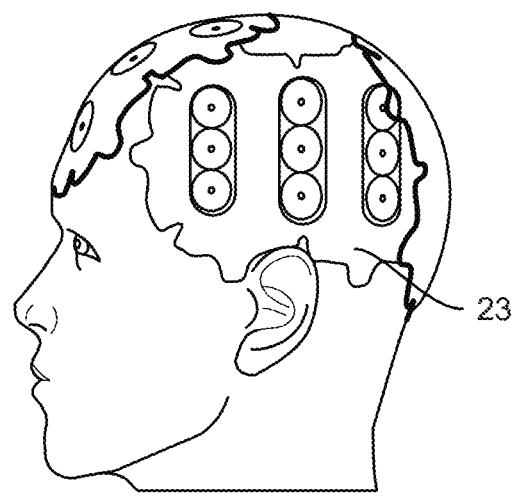

One example of such an anatomic context is when TTFields are applied between a nine-element electrode assembly positioned on the front/top of a subject's head (e.g., as in FIG. 2A) and a second nine-element electrode assembly is positioned on the back of a subject's head (e.g., as in FIG. 2B). In this anatomic context, if the same signal is applied between all nine electrode elements in the FIG. 2A array and all nine electrode elements of the FIG. 2B array, the rear-most three elements of the FIG. 2A array and the upper three elements of the FIG. 2B array will typically run significantly hotter than the remaining elements on those arrays. More specifically, a heat map analysis of this situation revealed that the rear-most three elements of the FIG. 2A array operated at about 37.5° C., while the other six elements of that array operated at about 36.25° C. In these anatomic contexts, instead of wiring capacitors in series with the corner elements (as described above), the spread of operating temperatures between the electrode elements on a given array can be reduced by wiring capacitors in series with the three electrode elements positioned at the hotter-running end of the array.

In other anatomic contexts, a different subset of the electrode elements may tend to run hotter than the rest of the electrode elements. In these contexts, the spread of operating temperatures between the electrode elements on a given array can be reduced by hard-wiring capacitors in series with whichever electrode elements are expected to run hotter.

When it is not known in advance which electrode elements will run hotter than the other electrode elements, using the embodiments that include an individual respective switchable capacitor (as in the FIG. 8 embodiment) for each electrode element or an individual respective variable capacitor (as in the FIG. 9 embodiment) for each electrode element can be beneficial. This is because the controller 530/630 can ascertain which electrode elements are running hotter in real time, and increase the series impedances to those electrode elements. The increased impedance will decrease the current at those electrode elements, which will bring the temperature of those electrode elements down, which will reduce the spread of operating temperatures.

Note that while the example embodiments illustrated in FIGS. 3-10 all depict nine electrode elements E1-E9 arranged in a rectangular pattern, the concepts described herein are equally applicable to electrode assemblies with a different numbers of electrode elements and/or electrode assemblies in which the electrode elements are arranged in other patterns (e.g., round, oblong, polygonal, or irregular patterns).

Embodiments illustrated under any heading or in any portion of the disclosure may be combined with embodiments illustrated under the same or any other heading or other portion of the disclosure unless otherwise indicated herein or otherwise clearly contradicted by context.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An apparatus for applying an alternating electric field to a living subject, the apparatus comprising:
   a plurality of conductive regions, each of the conductive regions having a front face and a respective area, wherein the plurality of conductive regions includes a plurality of first conductive regions and at least one second conductive region;
   a plurality of regions of dielectric material, each of which has (i) a respective front face and (ii) a respective rear face disposed against the front face of a corresponding one of the plurality of conductive regions;
   a substrate configured to hold the front faces of the plurality of regions of dielectric material on or in the subject's body and support the plurality of conductive regions at respective positions;
   a main conductor that is electrically connected to each second conductive region; and
   a plurality of capacitors, each of which has a respective first terminal electrically connected to a respective one of the first conductive regions and a respective second terminal electrically connected to the main conductor.

2. The apparatus of claim 1, wherein the respective positions are distributed about a centroid, and wherein each of the first conductive regions is positioned more peripherally with respect to the centroid than each second conductive region.

3. The apparatus of claim 2, wherein the apparatus has at least four first conductive regions and at least five second conductive regions.

4. The apparatus of claim 1, wherein the apparatus has at least three first conductive regions and at least six second conductive regions, and
   wherein the respective positions are distributed in a pattern such that each of the first conductive regions is positioned at a given single end of the pattern, and none of the second conductive regions are positioned at the given single end of the pattern.

5. An apparatus for applying an alternating electric field to a living subject, the apparatus comprising:
   a plurality of conductive regions, each of the conductive regions having a front face and a respective area, wherein the plurality of conductive regions includes a plurality of first conductive regions and at least one second conductive region;
   a plurality of regions of dielectric material, each of which has (i) a respective front face and (ii) a respective rear face disposed against the front face of a corresponding one of the plurality of conductive regions;
   a substrate configured to hold the front faces of the plurality of regions of dielectric material on or in the subject's body and support the plurality of conductive regions at respective positions; and
   a plurality of first capacitors, each of which is electrically connected in series with a respective first conductive region.

6. The apparatus of claim 5, wherein the respective positions are distributed about a centroid, and wherein each of the first conductive regions is positioned more peripherally with respect to the centroid than each second conductive region.

7. The apparatus of claim 6, wherein the apparatus has at least four first conductive regions and at least five second conductive regions.

8. The apparatus of claim 5, wherein the apparatus has at least three first conductive regions and at least six second conductive regions, and
   wherein the respective positions are distributed in a pattern such that each of the first conductive regions is positioned at a given single end of the pattern, and none of the second conductive regions are positioned at the given single end of the pattern.

9. The apparatus of claim 5, further comprising a plurality of electronically controllable switches, each of which is (a) electrically connected in parallel with a respective one of the first capacitors and (b) controllable by a respective electrical signal.

10. The apparatus of claim 5, wherein each of the plurality of first capacitors is a variable capacitor whose capacitance is controllable by a respective electrical signal.

11. The apparatus of claim 5, further comprising a connector having a plurality of pins, wherein the series connection between each of the plurality of first capacitors and the respective first conductive region passes through a respective pin of the connector.

12. The apparatus of claim 5, wherein the apparatus has at least four first conductive regions, at least five second conductive regions, and at least four first capacitors.

13. The apparatus of claim 12, further comprising at least four electronically controllable switches, each of which is (a) electrically connected in parallel with a respective one of the first capacitors and (b) controllable by a respective electrical signal.

14. The apparatus of claim 12, further comprising a connector having at least four pins, wherein the series connection between each of the at least four first capacitors and the respective first conductive region passes through a respective pin of the connector.

15. The apparatus of claim 12, further comprising at least five second capacitors, each of which is electrically connected in series with a respective second conductive region.

16. The apparatus of claim 5, further comprising:
   a plurality of thermistors, each of which is (a) positioned in thermal contact with a respective first conductive region and (b) configured to generate a respective first signal in response to a detected temperature,
   wherein each of the first capacitors is a variable capacitor having a respective capacitance-control input that receives a respective one of the first signals.

* * * * *